July 23, 1963  S. LISS ETAL  3,098,969
APPARATUS FOR AUTOMATIC TESTING OF A POTENTIOMETER'S
LINEARITY AND TOTAL RESISTANCE INCLUDING ACTUATING
MEANS RESPONSIVE TO A PREDETERMINED
PERCENT OF ERROR
Filed June 20, 1960  7 Sheets-Sheet 1

SAUL LISS
RUBIN R. KAYLIN
INVENTORS

BY Andrew L. Bain
George B. Oujevolk
ATTORNEYS

United States Patent Office 3,098,969
Patented July 23, 1963

3,098,969
APPARATUS FOR AUTOMATIC TESTING OF A POTENTIOMETER'S LINEARITY AND TOTAL RESISTANCE INCLUDING ACTUATING MEANS RESPONSIVE TO A PREDETERMINED PERCENT OF ERROR
Saul Liss and Rubin R. Kaylin, Fair Lawn, N.J., assignors to General Precision Inc., Little Falls, N.J., a corporation of Delaware
Filed June 20, 1960, Ser. No. 37,257
6 Claims. (Cl. 324—63)

The present invention relates to the testing of potentiometers and more particularly to the testing of potentiometers used in high precision electronic components, e.g., for computers.

Generally, in electrical work, precision to about ten percent is acceptable. However, in certain fields where precision instruments are used, i.e., scientific instruments, computers, etc., the components must be accurate to a much higher degree. A fundamental electrical component is a potentiometer. Physically, the potentiometer is a circular device with terminals at the beginning and the end point. A third terminal known as the wiper travels between the other terminals. The circular path of travel may be over solid material, e.g., carbon, or may be wire windings. The present invention is particularly useful in the precision testing of wire wound potentiometers. When such a potentiometer is tested, several things are apparent. In the first place, even though the mechanical path of travel will go through the desired arc, e.g., 360°, the electrical resistance does not vary over 360°. In most potentiometers, the first and last few degrees show no change in resistance. The usual range of a 360° potentiometer is 354° but in some special cases there are 357° of electrical resistance variation. In wire wound potentiometer the wiper moves from strand to strand so that the least variation in resistance is limited by the resistance between two wire strands. Effectively therefore, the plotted output of any wire wound potentiometer must be zig-zag in shape as indicated by the schematic symbol therefor. Potentiometers may be one turn, e.g., 360°, multiturn, e.g., 3600°, single or multigang. A multigang potentiometer is a plurality of potentiometers driven in parallel on one shaft. Such potentiometers are extensively used in computer circuitry when related functions or electrical resistance value is used for a plurality of purposes simultaneously.

The particular tests to be applied to a potentiometer depend on the purpose for which the potentiometer is intended. Depending on the requirements of the purchaser or user, the tests may vary. However, the tests will generally relate to several of the following factors: (1) linearity or conformity; (2) tracking; (3) mechanical and electrical rotation; (4) total resistance. In addition, the potentiometer may be tested for noise, torque, limit stop strength, tap location and index point. The present invention is particularly directed to testing the first four factors mentioned and may also be used to test the tap location and index points.

Regarding the tests mentioned to which this invention is directed, a brief explanation may be helpful. The total resistance usually presents no problem since this is readily ascertained in bridge circuits. Mechanical and electrical rotation refer of course to the degrees of turning where the potentiometer is effective. Mechanically, the wiper of a one turn potentiometer may not rotate the full turn, e.g., 360°. Even if the wiper rotates mechanically for 360°, the resistance will not vary over this entire angle. The testing of the conformity or linearity and tracking of a potentiometer is both difficult and important. Linearity means that the plotted output should be a straight line, or as near a straight line as possible. Thus, if a potentiometer is to vary one ohm per degree, at the 0° mechanical position the reading should be zero ohms and each degree position intermediate 0° and 360° should furnish the corresponding resistance value. The term conformity relates to non-linear potentiometers, e.g., where the resistance variation is the square of the mechanical position. This term simply means that the potentiometer must be tested to ascertain whether or not the desired resistance variation exists over the length of the arc. The term tracking is applied to a multigang potentiometer and means that the variations in resistance for each potentiometer of the gang will be proportionately the same over the entire path of travel.

Heretofore, potentiometers have been tested against one master potentiometer. Thus, the master and the potentiometer under test are placed in parallel. The two wipers, i.e., that of the potentiometer under test and that of the master are connected to a null detector or indicator. Both potentiometers are rotated simultaneously. As long as the indicator shows a null there is no error in linearity or conformity. In practice it often takes over eight hours to completely test a three gang potentiometer assembly. The cost of such testing is high, time consuming, and skill, experience and attentiveness is required by the persons performing the tests. Although many attempts were made to overcome the foregoing difficulties so as to test potentiometers in a simple and expedient way, none, as far as we are aware was entirely successful when carried into practice on an industrial scale.

It has now been discovered that potentiometers can be tested within the space of minutes by semi-skilled technicians.

Thus, it is an object of the present invention to provide a device for testing, for linearity, or conformity potentiometers which are single turn or multiturn, single cup or mutigang.

Another object of the present invention is to provide a device for testing potentiometers within a short period of time.

Still another object of the present invention is to provide a device which will test potentiometers with great accuracy.

The invention further contemplates the provision of a device which is simple to operate and can be operated by persons below the level of technicians, without operation interpretation.

It is also within the contemplation of the present invention to provide a single device which will test potentiometers for linearity or conformity, tracking, mechanical and electrical rotation, and total resistance.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which.

As heretofore explained, potentiometers are usually tested against a master potentiometer. Since in the present invention no master potentiometer is used, it is first necessary to understand the fundamental approach of the present invention before explaining the details of the apparatus herein contemplated. A potentiometer which is schematically depicted as having a resistance R and a wiper W in reality has a plurality of resistances. In addition to the resistance of the main portion of the potentiometer $R_1$ there is also to be considered the end resistances $R_2$ and $R_3$. If the resistance of the potentiometer were to vary uniformily between start and end position, e.g., 0° and 360°, the plot of the resistance for angular wiper position would be a straight line. However, in a wire wound potentiometer, since the wiper moves from strand to strand, the limit of the potentiometer resolution is of course the limit of the resistance between two wire strands. No in between resistance determination is possible.

Since the resistance of the potentiometer over 360° is not a straight line, it is necessary to set the limit that the potentiometer resistance may vary on either side of the straight line. For the present explanation, the maximum permissible deviation has been set at 4 units, indicated as 4 ohms in FIG. 3 having boundary lines D—D' on both sides of centerline O—O' of the graph of FIG. 3. Ignoring for the time being the circuitry shown schematically at the top of FIG. 3, it is obvious that by placing boundary lines D—D' on both sides of centerline O—O', the maximum permissible deviation is not 4 units or 4 ohms but 8 ohms, i.e., the maximum permissible deviation intended is not that between D and D' but between any one of the following points: D—O; C—A'; B—B'; A—C'; or O—D'. In the coarse potentiometer tester first described where the maximum possible deviation is established at four units, once the potentiometer has deviated four units no matter which way or in what direction, the reject light will flash. For the purpose of the present invention, potentiometer deviation is the average deviation set for the entire potentiometer. Once the potentiometer deviation has exceeded the set number of units equal to the average, in this case four units, no matter where within the boundaries of the permissible deviation, the potentiometer is rejected.

If the potentiometer were perfectly linear, the resistance at any angular position with respect to the total potentiometer resistance would form a perfect ratio to the angle at that position with respect to the total angular path of travel, i.e., $$\frac{\text{Wiper angle of rotation}}{\text{Total angle of rotation}} = \frac{\text{potentiometer resistance at that angle}}{\text{total potentiometer resistance}}$$

and this ratio would be true regardless of the total resistance of the potentiometer under test, provided of course we are dealing with potentiometers effective over the entire area of rotation, e.g., if the total resistance at 360° is 3600 ohms and at 0° the resistance is 0 ohms, the resistance at 180° would be 1800 ohms; and, if the total resistance at 360° of the potentiometer is 1000 ohms and the resistance at 0° is 0 ohms, the resistance at 180° is 500 ohms. Heretofore, a potentiometer under test was compared to a master potentiometer. The present invention does not contemplate testing the potentiometer under test with a master. On the contrary, the present invention differs in approach from the standard test method by using the ratio approach used in bridge circuits. For example, assuming that there is a power source of ten amperes which are dropped across two resistors in parallel, one a four ohm resistor, the other a six ohm resistor; six amperes will travel along the four ohm resistor and four amperes along the six ohm resistor. If the voltage from both resistors is fed to a null detector at the three-quarter position of each of the resistors, the voltage across the six ohm resistor at the three-quarters point will be ¾ x 6 ohms x 4 amperes or 18 volts. Across the four ohm resistor, the voltage at the three-quarters point will be ¾ x 4 ohms x 6 amperes or 18 volts. As long as a null detector travels percentagewise the same distance along each resistor, a null voltage is obtained.

Generally speaking, the potentiometer tester herein contemplated comprises in combination; moving means, for turning a potentiometer under test along the wiper positions of said potentiometer and, at the same time moving a code holder; a bank of resistors adapted to be fed amperage in parallel with a potentiometer under test, the resistors of said bank being actuated by said code holder in accordance with the position of said code holder, said bank being adapted to furnish a changing resistance value according to said code; tap means in said bank adapted to tape the proportional drop in potential across said bank to said tap for any particular combination of resistors in said bank; junctions means for joining the output of said tap and said potentiometer wiper across a null detector; a null detector fed by said junction means; electrical units adapted to be fed to said detector; trigger means actuated by said detector when said detector is not at null adapted to release said electrical units into said detector to bring it back to null; a memory remembering the value of the electrical units fed to said detector; and, indicating means indicating when a predetermined number of said units fed to said detector has been exceeded.

To broadly describe the invention there is depicted in the drawing a simplified or coarse potentiometer test apparatus. This device is suitable for testing the linearity of a single turn potentiometer. Although as hereinbefore mentioned, a potentiometer is not effective electrically and mechanically through 360° of rotation, this feature has been purposely omitted for the present to better explain the operation of the coarse potentiometer tester. For practical application a more complex apparatus is preferred. But, the fundamental principles relating to the preferred embodiment are the same as those relating to the test apparatus. Once the operation of the coarse test apparatus is understood, the embodiment of the concept involved in a more complex apparatus and the advantages thereof will be more readily appreciated.

Figure 4A:
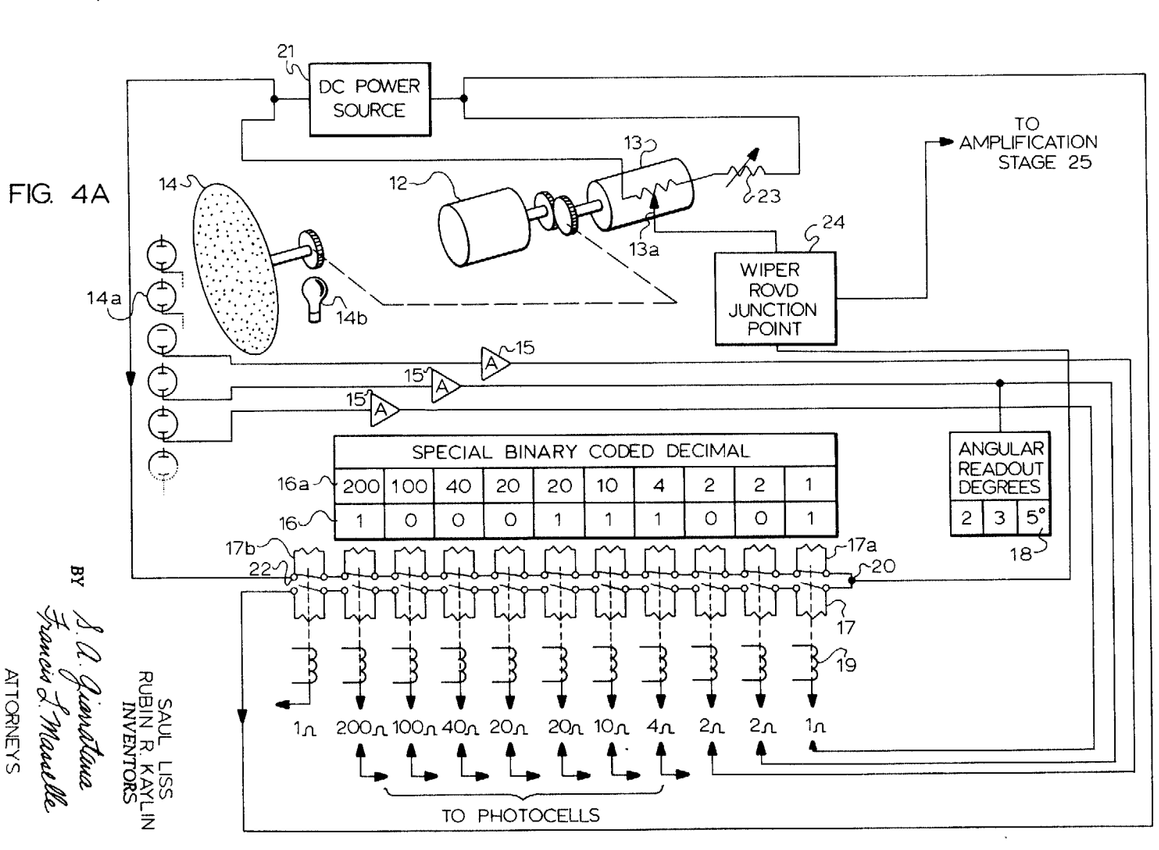
FIG. 4a is a schematic and block diagram of one portion of a coarse instrument utilizing the underlying scientific principles herein contemplated.

The test apparatus has a motor 12 adpted to rotate a single turn potentiometer 13 under test through 360°. Potentiometer 13 is assumed to be effective over 360°. Rotated simultaneously with the potentiometer through the 360° is a binary decimal encoder 14. This type of encoder by computer circuitry known in the art will convert angular degrees to the binary decimal code outlined in Table I. This arrangement is depicted schematically as a code wheel or binary decimal encoder 14, photocells 14a and a light source 14b.

TABLE I

*Decimal Reading, Radices and Coefficients*

| Angular degree | 200 | 100 | 40 | 20 | 20 | 10 | 4 | 2 | 2 | 1 |
|---|---|---|---|---|---|---|---|---|---|---|
| | Binary representation ||||||||||
| 1 | 0 | 0 | 0 | 0 | 0 | 0 | 0 | 0 | 0 | 1 |
| 2 | 0 | 0 | 0 | 0 | 0 | 0 | 0 | 0 | 1 | 0 |
| 3 | 0 | 0 | 0 | 0 | 0 | 0 | 0 | 0 | 1 | 1 |
| 4 | 0 | 0 | 0 | 0 | 0 | 0 | 1 | 0 | 0 | 0 |
| 5 | 0 | 0 | 0 | 0 | 0 | 0 | 1 | 0 | 0 | 1 |
| 6 | 0 | 0 | 0 | 0 | 0 | 0 | 1 | 0 | 1 | 0 |
| 7 | 0 | 0 | 0 | 0 | 0 | 0 | 1 | 0 | 1 | 1 |
| 8 | 0 | 0 | 0 | 0 | 0 | 0 | 1 | 1 | 1 | 0 |
| 9 | 0 | 0 | 0 | 0 | 0 | 0 | 1 | 1 | 1 | 1 |
| 10 | 0 | 0 | 0 | 0 | 0 | 1 | 0 | 0 | 0 | 0 |
| 11 | 0 | 0 | 0 | 0 | 0 | 1 | 0 | 0 | 0 | 1 |
| 12 | 0 | 0 | 0 | 0 | 0 | 1 | 0 | 0 | 1 | 0 |
| 13 | 0 | 0 | 0 | 0 | 0 | 1 | 0 | 0 | 1 | 1 |
| 19 | 0 | 0 | 0 | 0 | 0 | 1 | 1 | 1 | 1 | 1 |
| 22 | 0 | 0 | 0 | 0 | 1 | 0 | 0 | 0 | 1 | 0 |
| 36 | 0 | 0 | 0 | 0 | 1 | 1 | 1 | 0 | 1 | 0 |
| 90 | 0 | 0 | 1 | 1 | 1 | 1 | 0 | 0 | 1 | 0 |
| 105 | 0 | 1 | 0 | 0 | 0 | 0 | 1 | 0 | 0 | 1 |
| 193 | 0 | 1 | 1 | 1 | 1 | 1 | 0 | 0 | 1 | 1 |
| 245 | 1 | 0 | 1 | 0 | 0 | 0 | 1 | 0 | 0 | 1 |
| 359 | 1 | 1 | 1 | 0 | 0 | 1 | 1 | 1 | 1 | 1 |
| 360 | 1 | 1 | 1 | 1 | 0 | 0 | 0 | 0 | 0 | 0 |

The output of binary decimal encoder 14 is passed through amplifier means 15. This provides a special binary coded decimal angular output 16 as shown in Table I, and an angular readout in degrees 18. Special binary coded decimal output 16 operates a relay operated voltage divider or ROVD 17. In depicting the special binary coded decimal in the drawing, the decimal values 16a are also given. These units are provided merely to facilitate understanding of the invention. In practice there is no readout of these values or of the special binary coded decimals 16, the readout being in angular degrees 18. ROVD 17 has a plurality of resistances 17a. There are two resistance values corresponding to each special binary coded decimal value 16. Thus, associated with the 1 decimal readout of output 16 are two 1 ohm resistors; with each of the 2 decimal outputs are two 2 ohm resistors; with the 4 decimal output; two 4 ohm resistors and so on. Thus, with the 200 decimal reading there are associated therewith two 200 ohm resistors. At one end of the resistor bank, in this case the high end, there has been added two 1 ohm resistors 17b. The purpose of these two extra 1 ohm resistors will soon become clear.

Each resistance of the ROVD is located opposite the corresponding resistance of equal value, i.e., 1 ohm opposite 1 ohm; 2 ohm opposite 2 ohm; 100 ohm opposite 100 ohm; 200 ohm opposite 200 ohm. Associated with each such opposed pair are switch means 19. The center tap 20 of the ROVD is between the two 1 ohm resistors on the low side of the bank. Adding all the resistances on either side of the center tap, i.e., each one of each pair of opposed resistors will give 400 ohms. The reason for the extra 1 ohm resistance is now explained. Without this extra 1 ohm resistance 17b, the total resistance on each side of the center tap would be 399. The extra one ohm makes this 400 ohms. Although, this extra 1 ohm is not necessary, it simplifies mathematical computations.

Switch means 19 is so constructed that when one resistor is switched in, the corresponding resistor of the pair is shorted out. The opposed terminals of the D.C. power source 21 are connected to one of each of the pair of end resistors on the high side of the resistor bank. At 0° rotation there is no signal from binary decimal encoder 14 to any switch in switch means 19. All the resistors downstream of center tap 20 are switched in and all those upstream of center tap 20 are shorted out. At 0°, current entering upstream terminal 22 will therefore go directly to center tap outlet 20 shorting across the entire upstream bank of resistors. There is thus zero resistance at center tap 20 at 0°. At the 1° rotation, the switch corresponding to the 1 special binary coded decimal is actuated by the signal from reading station 14a of the binary decimal encoder 14. This closes the 1 ohm resistance upstream of the center tap and shorts across one ohm downstream of the center tap. The voltage drop ratio at center tap 20 is thus 1/400. At 2° the 2 special binary coded decimal corresponding switch is actuated by the signal from the reading station, i.e., photocells 14a and of course the 1 switch goes back to its former position. There are now 2 ohms upstream of center tap 20 and 398 ohms downstream of the center tap position so that the voltage ratio at center tap terminal 20 is now 2/400. For the special binary coded decimal angular position corresponding to 3° of rotation, both the 2 ohm resistor switch and the 1 ohm resistor switch are actuated by the signals provided by binary decimal encoder 14 and photocells 14a. For the 235° rotation shown in the angular readout, special binary coded decimal reading is:

| (Binary code) | 200 | 100 | 40 | 20 | 20 | 10 | 4 | 2 | 2 | 1 |
|---|---|---|---|---|---|---|---|---|---|---|
| (Binary decimal) | 1 | 0 | 0 | 0 | 1 | 1 | 1 | 0 | 0 | 1 |

Thus, the switches corresponding to 200, 20, 10, 4 and 1 ohm resistors are actuated and the corresponding resistances are shorted out downstream of the center tap and placed upstream of center tap 20. The voltage ratio at the center tap is therefore 235/400.

There has thus been developed a ratio arrangement with a denominator of 400. However, at the 360° point of the potentiometer, remembering that the potentiometer being tested has resistance up to 360°, there will be 360 ohms upstream and 40 ohms downstream of the center tap. We must thus account for 40 ohms at the 360° point of the potentiometer. In other words, something is needed to facilitate comparison between the potentiometer and the ROVD. This may be done by coupling a resistance of a known value with the potentiometer, e.g., a series arrangement. There is thus added a resistance to the high angle of the potentiometer by a balancing trimmer 23. The value of the balancing trimmer resistance 23 is found by the formula:

$$\frac{\text{Ohms upstream of center tap at potentiometer high angle}}{\text{ROVD total ohms}} = \frac{\text{Test potentiometer total ohms}}{\text{Trimmer resistance value} + \text{test potentiometer total ohms}}$$

There are 360 upstream and a total ROVD resistance of 400 ohms at the high angle. If the potentiometer under test is supposed to have a total resistance of 90 ohms, the value of trimmer resistance 23 is set at:

$$\frac{360}{400} = \frac{90}{90 + \text{trimmer}}; \quad \text{trimmer} = \frac{400}{300} \times 90 - 90 = 10 \text{ ohms}$$

Figure 4B:
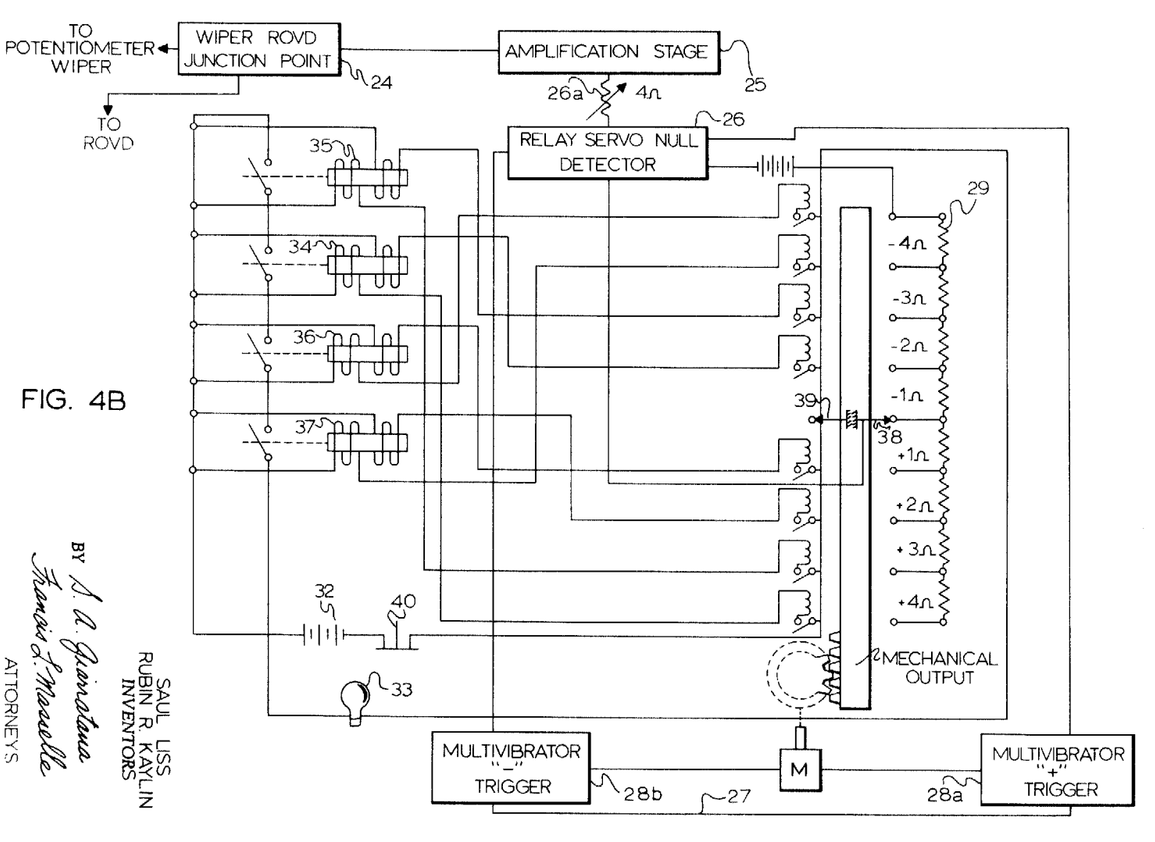
FIG. 4b is a continuation of the schematic and block diagram shown in FIG. 4a showing another portion of a coarse instrument utilizing the underlying scientific principles herein contemplated.

When the ohmic value of high angle trimmer resistance 23 has been added to the potentiometer output, since the potentiometer and trimmer are in parallel to ROVD 17 with respect to D.C. power source 21 there is now a value which can be fed through wiper 13a to a null detector placed at junction point 24 of the wiper and the ROVD center tap 20. Thus, if the potentiometer under test is 90 ohms, with 10 ohms in the trimmer there are a total of 100 ohms in parallel with 400 ohms of ROVD 17. If the current from D.C. power source 21 is 5 amperes, 4 amperes will pass through test potentiometer 13 and trimmer 23 while 1 ampere will pass through the ROVD. At 16° rotation there are 16 ohms upstream of center tap 20 in ROVD 17 so that the output to junction point 24 from the center tap is 16 volts, i.e., 16 ohms×1 ampere. Test potentiometer 13 should have a resistance of 4 ohms at 16° rotation. If the potentiometer is accurate, the voltage supplied by wiper 13a to junction point 24 is 16 volts, i.e., 4 ohms×4 amperes so that, if the resistance of potentiometer 13 is what it should be at that angle, the reading of a null detector at junction point 24 would be null. The output from junction point 24 is fed to an amplification stage 25 where the error or difference in output between the wiper and the ROVD center tap is amplified. The output of the amplification stage is then fed to a relay servo null detector 26 whose function will be apparent shortly. From relay servo null detector 26, the output is fed to a multivibrator trigger circuit 27 having a "+" trigger 28a and a "−" trigger 28b. These triggers are part of an error-measuring servomechanism device as described in Kent's "Mechanical Engineer's Handbook—Design and Production Volume," 12th edition, John Wiley and Sons, N.Y., Section 17–15, "Servomechanisms," wherein a servomechanism is defined as an automatic system used for control of mechanical position. The output or mechanical load is driven by a servomotor. The error-measuring device takes the difference between the actual output position and the desired or input position. The return of the output position measurement through the error-measuring device and then on to control the motor forms a closed cycle which is characteristic of servomechanisms. The characteristics of trigger circuit 27 is such that if the voltage output from the amplification stage 25 is "plus" the output will actuate "+" trigger 28a and if the output is "minus," "−" trigger 28b will be actuated. Trigger circuit 27 will mechanically drive a stepper circuit 29, i.e., step resistors contact 38 the required number of steps in the proper direction so that the relay servo null detector 26 is driven back to its null. The manner in which this is accomplished is that on the input side of relay servo null detector 26 is a balancing resistor 26a which is set at the total number of step resistor units on one side of contact 38. On the drawing, the stepper has eight 1 ohm resistors, four on either side of the stepper zero position. Balancing resistor 26a is thus set at 4 ohms. Assume that at zero error in the test potentiometer, amplification stage 25 is set to furnish a current of 10 amperes. The "null point" of relay servo null detector 26 is thus 40 volts, or the 10 amperes dropped across the 4 ohms of balancing resistor 26a. Any value below 40 volts is a "minus" value and any value above 40 volts is a "plus" value as far as trigger circuit 27 is concerned. Stepper circuit power source 29b is adapted to furnish a counter current of 10 amperes across four 1 ohm resistors to relay servo null detector 26 when the stepper circuit contact 38 is not actuated by trigger circuit 27, i.e., 40 volts are supplied by the stepper circuit to balance out the 40 volts from the amplifier stage to the servo. If because of a deviation of potentiometer 13, only 5 amperes are dropped by the amplification stage across resistor 26a furnishing only 20 volts to the relay servo null detector 26, contact 38 will be moved upwards −2 ohms by trigger circuit 27, i.e., 2 ohms are subtracted from the bank of stepper resistors so that the voltage across the stepper circuit supplied to relay servo null detector 26 is likewise 20 volts.

Figure 1:
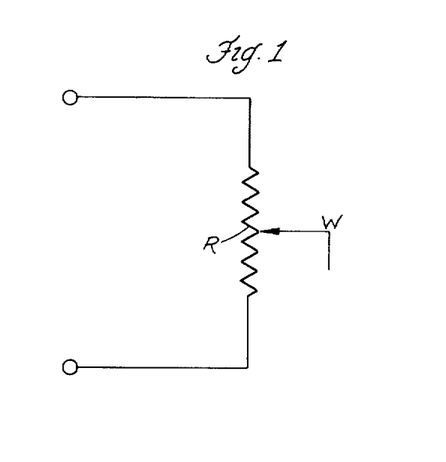
FIG. 1 shows the schematic representation of a potentiometer as it is usually depicted by those skilled in the art.
Figure 2:
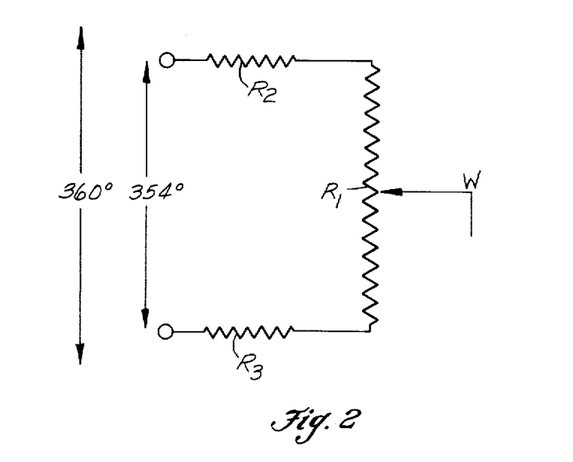
FIG. 2 is a schematic representation of the potentiometer depicted in FIG. 1 showing the various factors which must be taken into account in testing a potentiometer.
Figure 3:
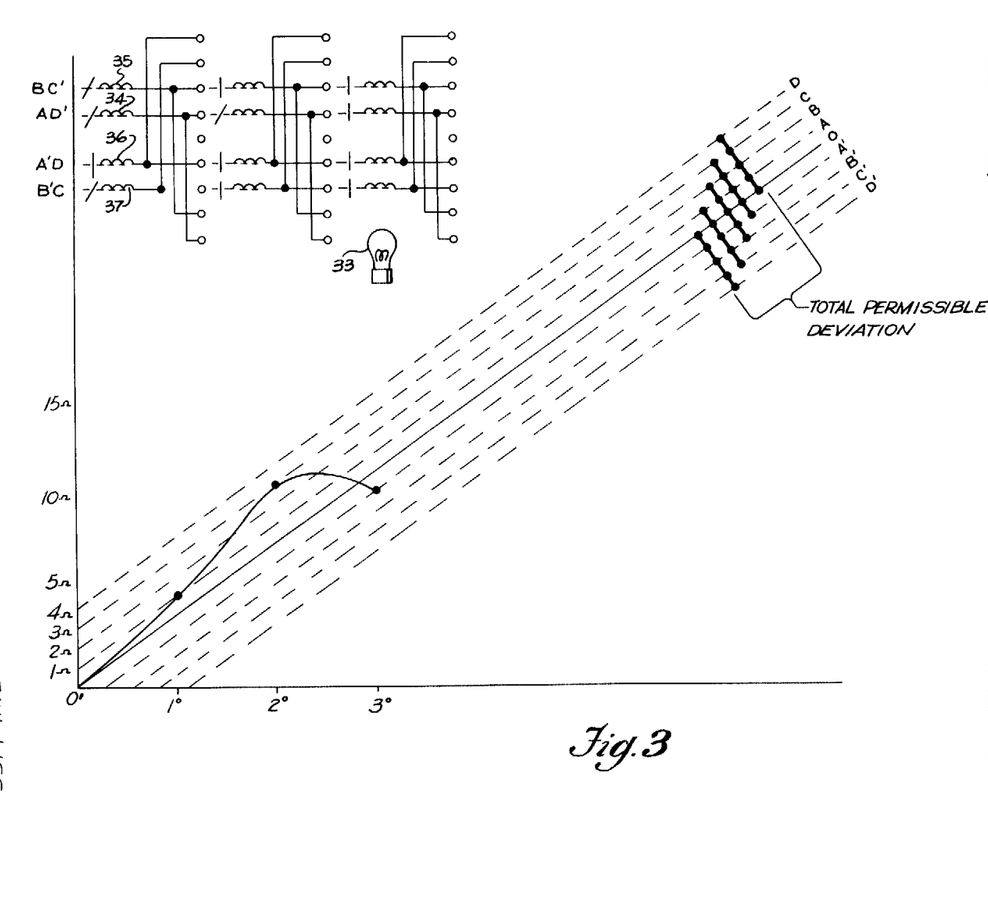
FIG. 3 is a graphic representation of the meaning of potentiometer linearity for the purposes of the present invention.

Associated with the stepper circuit is a memory circuit 30 which judges the potentiometer. As hereinbefore explained, the theoretical resistance increase between 0° and 360° is a straight line and the permissible deviation as shown in FIGURE 3 is set at four units of stepper resistors. These four units are indicated by four lines, A, B, C, D, and A', B', C', D' on both sides of centerline O—O of FIGURE 3. This makes a total of eight lines across the centerline O'—O. To allow for only four units of deviation regardless of which side of the centerline this deviation may take place, memory 30 (see also FIGURE 4) has a separate circuit 31 having a power source 32, a light bulb 33 and four latch switches 34, 35, 36 and 37.

Circuit 31 (FIGURE 7) is closed and light 33 will light only when the four switches are closed. If any of the four latch switches are open, light 33 will not flash. The switches latch so that once closed, they stay closed unless released by release button 40 which opens the circuit releasing all four switches. Associated with each switch are two contact points. Each pair of contact points corresponds with two resistances in stepper circuit 29 separated from each other by only four units in the stepper, i.e., within the permissible deviation range. Thus, assume that the step resistances in circuit 29 are each one ohm value. As shown, there are eight resistances and a center position. This gives values of +1 ohm; −1 ohm, +2 ohms, etc. In the present case, it is assumed that the total stepper resistance on either side of the center point is the permissible deviation. To allow only four error units (not counting the center position since the center is not an error) the switches corresponding to the following resistance values must be paired: +1 ohm and −4 ohms; +2 ohms and −3 ohms; +3 ohms and −2 ohms; +4 ohms and −1 ohm. The difference between any of these paired resistance is 5 ohms or outside the error range while anything within any of the paired units is only 4 ohms and within the predetermined tolerance limits. The operation of memory circuit 30 is graphically illustrated in FIGURE 3, the error positions shown in graph form and the circuitry shown above each error. As depicted in FIGURE 3, even though there are a total of eight units across the centerline O'—O of FIGURE 3, i.e., four above and four below, once the error total has reached four, no matter how or where within the set limits the four units have been reached, the four latch switches of circuit 31 will be closed and light 33 will flash. At the 1° position in FIGURE 3, the error of the test potentiometer is +1 ohm. Contact 38 thus moves across the +1 ohm resistor and corresponding contact 39 of the latch switches moves across the latch switch 36 contact which closes this switch. At 2° there is an error of +3 ohms. Contact 38 moves across two more resistors to the +3 ohm position and contact 39 has closed switches 35 and 37. The only open latch switch is No. 34. At 3° there is an error of −1 ohm. Even though this value is within the limit D—D' on both sides of centerline O'—O, the total predetermined tolerance limits are exceeded since from +3 to −1 is five units and the limit is four units. Reject light 33 will therefore flash as four latch switches will be closed when contact 38 moves to −1 ohm.

There has now been described a coarse potentiometer tester having moving means 12 adapted to revolve a test potentiometer 13 along the wiper positions 13a of said potentiometer. The test potentiometer 13 is in parallel to a relay operated voltage divider 117 having a plurality of different resistor values actuated by a code holder, e.g., binary decimal encoder arrangement 14 moved together with the potentiometer under test so that the relay operated voltage divider will furnish a changing resistance value in proportion to the angle of rotation of the potentiometer. Relay operated voltage divider 17 has a center tap 20 to tap the proportional drop in potential thereof for any particular rotational angle of said potentiometer. The output of said center tap 20 and wiper 13a are fed to a null detector 26 adapted to measure the electrical value required to bring said detector back to its null, if its null is exceeded in either direction. Detector 26 is balanced by a stepper circuit 29 whose electrical values are so set as to balance out the voltage of detector 26 when said detector is at its null. If the detector null is exceeded, a trigger circuit 27 is fed by detector 26 will actuate stepper circuit contact 38 so that current from the stepper circuit source 29b will have to drop across more or less step resistors to balance out the detector. At the same time, each stepper resistance is paired with another stepper resistance a predetermined number of steps apart. When any of said resistors are crossed a latch switch of a memory is actuated. When all the latch switches of said memory are closed, a signal is given indicating a reject condition.

Figure 5:
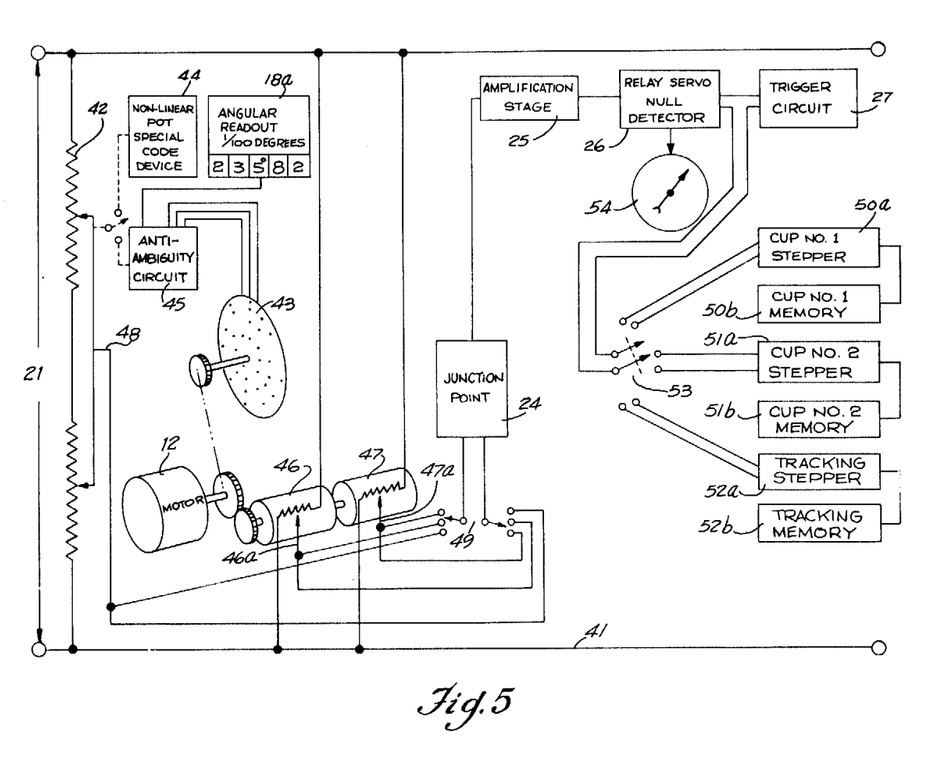
FIG. 5 shows a view similar to FIG. 4, but containing added features contemplated herein to provide precise results not obtainable with the coarse instrument depicted in FIGS. 4a and 4b.

The construction of a more precise instrument 41 of FIGURE 5, based upon the foregoing principles depends to some extent on the potentiometers to be tested. Binary encoder 14 depicted in FIGURE 4 is a rather simple device having ten radial photocells 14a and a light source 14b, the disk encoder 14 passing therebetween. The dots on the disk represent the binary decimal code selected. At the 1° position there is one dot at the top row, at 2°, there is a dot in the second row, at 3° there are two dots, one in the first and one in the second row, etc. Each row corresponds to one of the 1, 2, 2, 4, 10, 20, 20, 40, 100 and 200 positions. The amplified output of each photocell is fed to the proper switch 19 to actuate the corresponding resistor pair. But, such a simple arrangement is only useful to the extent illustrated. Angular readout 18a of FIGURE 5 provides readings to one-hundredth of a degree. To obtain this resolution, the following paired resistors are required in ROVD 42: 1; 1; 2; 2; 4; 10; 20; 20; 40; 100; 200; 200; 400; 1000; 2000; 2000; 4000; 10,000; and 20,000 ohms. To actuate the switches for these resistor pairs, a more complex encoder 43, e.g., a "Librascope" encoder is used. Such an arrangement provides a resolution of 1/40,000. For special tests, additional resistances of 20,000 and 40,000 can be added to the ROVD bank giving a resolution of 1/100,000. This in turn requires the use of a still more delicate and expensive instrument, e.g., a "Baldwin" 17 bit encoder. Although the code outlined in Table I is used with the "Librascope" encoder of FIGURE 5, other codes, i.e., other permutations and combinations of resistors may be mathematically derived. This is particularly true when testing non-linear potentiometers for conformity. In such case the device is either manually driven and the particular value of the nonlinear potentiometer is visually ascertained by the operator from a chart, or, as illustrated in the drawing, a non-linear potentiometer special code device 44 is substituted for the regular encoder 43. Such a special code device 44 might for example furnish resistance values which are the square, cube, roots, etc. of the rotational angle. Those skilled in the art will readily appreciate that the code herein described is merely the combination of one or more coded radices raised to one or more powers and combined with coefficients, the combination of which varies according to a certain predetermined mathematical function. Other mathematical combinations, i.e., other types of coded radices raised to one or more powers and corresponding coefficients may be similarly derived to perform either the same or different electrical or mechanical functions. For example, in the coarse device described to test potentiometers of 360 ohms the following code will furnish resistor values of between 1 ohm and 360 ohms, i.e., a denominator of 360 without the necessity of trimmer resistance 23: 1, 1, 2, 2, 4, 10, 20, 40, 60, 100, 100. Likewise, although the code holders herein illustrated are in combination with optical readouts, other types of code holders having other types of readouts are possible, e.g., tapes with magnetic readouts, may be used.

With the arrangement shown in FIGURE 5, where ROVD 42 can furnish a ratio of 1/40,000, an anti-ambiguity circuit 45 is usually associated with the encoder 43. Potentiometer tester 41 of FIGURE 5 is adapted to test multigang potentiometers. There is shown a potentiometer having two cups; cup 46 is cup No. 1, and cup 47 is cup No. 2. Each cup may be individually tested against ROVD 42 by having the centertap 48 of ROVD 42 as well as the wiper of the cup under test, e.g., wiper 46a or wiper 47a connected to junction point 24 by means of a multiway switch 49. A separate stepper and individual memory circuits are provided for each cup of the gang. In the arrangement shown, separate stepper and memory circuits, e.g., stepper 50a and memory 50b for cup No. 1; stepper 51a and memory 51b for cup No. 2; as well as a separate tracking stepper 52a and tracking memory 52b, are provided.

When testing the cups for tracking, the procedure is exactly the same as when testing one cup against the ROVD, except that the reference is now the first cup with respect to the second cup, instead of the ROVD. Angular readout 18a provides the angle tested as when testing against the ROVD. The relay servo null detector 26 and trigger circuits 27 are connected to the tracking stepper 52a by means of a second multiway switch 53. Advantageously, an error readout 54 is also provided.

Figure 6:
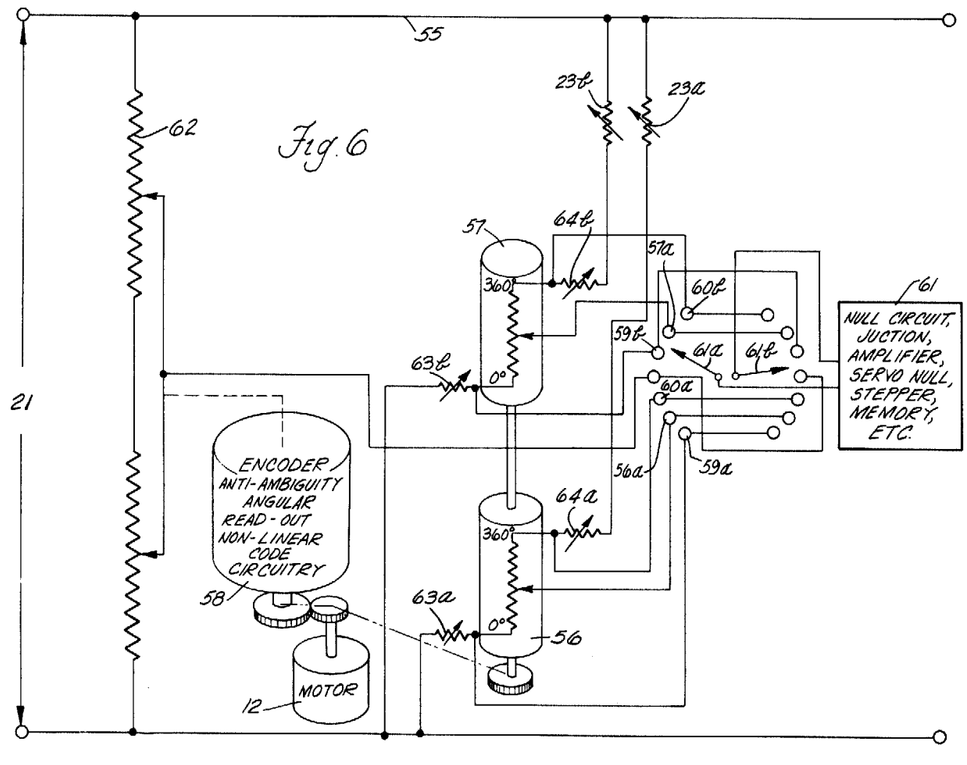
FIG. 6 is a schematic and block diagram of how to adjust the device herein contemplated to take into account certain minor factors, and, FIG. 7 is a schematic diagram of a memory circuit contemplated herein.

The adjustment for high and low angle of the potentiometer or cup is explained in circuit 55 wherein there is shown cups 56 and 57 in parallel with an ROVD. In this circuit, the encoder, anti-ambiguity circuit, angular readout, are represented as a block 58. From each cup, there is a low angle tap 59a, 59b and a high angle tap 60a, 60b. For simplicity, the junction point and the entire null detector circuit have been combined as component 61 having terminals 61a and 61b. In making low angle adjustment for one of the cups, low angle tap 59a is connected to one of the null circuit terminals, 61a and the wiper of that cup, e.g., wiper 56a is connected to the other terminal 61b. The wiper is placed up along the potentiometer where there is certain to be some resistance, i.e., at about 8° or 9°. The potentiometer is then slowly rotated down towards the 0° position until a null is reached. This point is recorded. Preferably, this point is also included among the permissible errors of the memory. ROVD 62 is then set to start its rotation from this low angle point, and the ROVD resistance for this position is balanced out by adjusting low angle trimmer 63a. The other cup having a similar low angle trimmer 63b. The high angle is tested in a way similar to the low angle. The null circuit 61 is connected across the wiper 56a and high angle tap 60a. The wiper is first placed at a point where there is certain to be resistance, i.e., at about 350° and slowly rotated to a null. This point is then recorded, and preferably included in the memory circuit. However, in the case of the high angle, it must be remembered that there is also a balancing trimmer 23a to account for the difference upstream and downstream of the centertap of ROVD 62 at the high angle. Since usually the same kind of potentiometers are to be tested, resistor 23a is usually fairly fixed. High angle trimmer 64a however must be set for each potentiometer or cup and is set at the difference between the desired resistance at the high angle plus balancing trimmer 23a and the actual resistance at the high angle plus balancing trimmer 23a. Wiper resistance is usually disregarded. Corresponding trimmers, e.g., 23b and 64b are indicative for potentiometer 57.

The testing of a potentiometer or cup for total resistance requires no explanation. Both sides of the centertap of the ROVD and balancing resistor 23 form the three legs of a bridge between which it is readily possible to balance the test potentiometer to determine the total resistance of the potentiometer.

In describing the invention herein, little has been said of the circuitry which is known in the art. For simplicity of explanation, certain liberties have been taken in the circuitry described. The potentiometer under test and the ROVD are shown in the drawing as being in parallel. In practice, it may be preferable to have individual precision power supply sources for the various components as more precise results may thus be obtained. Also, instead of multiway switches, adapter cables preferably are used. Amplifier 25 is indicated in block form. Since the device operates on a D.C. power supply, it is preferable to have the amplification stage include a chopper, A.C. amplifier and demodulator. Trigger circuit 27, might also be described as a "Schmitt" multivibrator trigger circuit. The stepper and memory circuits will normally have many more resistors and latch switches than shown. In one device used for actual testing, the error range is 24 units.

Contacts 38 and 39 are simple electromechanical movements known in the art.

Figure 7:
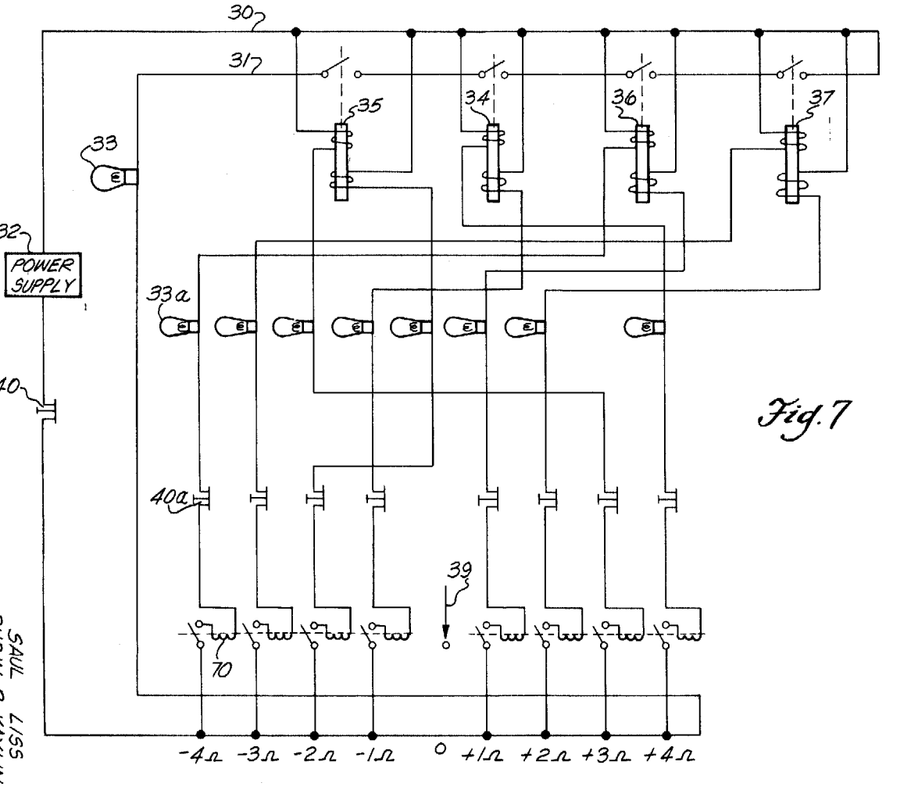

As shown in FIGURE 7, a much more elaborate memory may be used with little departure from the conception of FIGURE 4. The only addition in FIGURE 7 is a visual readout 33a for each error, and a separate release button 40a for each error. The latches 70 of the respective switches are known in the art.

For the purpose of giving those skilled in the art a better understanding of the invention, the following illustrative explanation is given of the procedure followed in actual operation:

ACTUAL OPERATION

The potentiometer tester in use is for checking 0.1% potentiometers. This tester can be modified slightly in order to test signal turn 0.05% potentiometers at an accuracy of 0.01% and 0.025% ten turn potentiometers at an accuracy of 0.005%.

Potentiometers accurate to ±0.1% are checked for linearity and conformity through angles of 360 or 3600 degrees and compared to the built-in relay operated voltage divider which has an accuracy of 0.0014%. The potentiometer slider angle is read directly on a visual decimal indicator while the linearity intelligence information is shown as a rejected or accepted unit by means of a visual "GO," "NO-GO" indicator light.

This potentiometer tester can test linear, non-linear, single turn, ten turn, single and multi-cup potentiometers without the use of a master potentiometer as a reference. Adapters are required for each of the different type mountings. Other tests which are performed include electrical function angle, index point, top locations, electrical total resistance, and tracking between gangs of a multi-gang potentiometer. Each of these tests may be performed to the tolerance requirements of the function ranging from 0.05% to 40%, depending upon the correct trim values of resistance in the range unit.

For multi-gang potentiometer testing, the operator prepares the test console for the index mode of operation desired and then aligns the gear train assembly to the index point. The index point may be any tap location or end point, for example, 180.00 degrees. The adapter cable, shown in the drawing as a multi-way switch, is connected to the potentiometer which is then adjusted for a null at the index point and inserted into the adapted assembly on the gear train. A readjustment for an accurate null is made and the potentiometer is then locked in place. The gear train and potentiometer are both at 180.00 degrees. The operator places the control switch to measure the index points of the other gangs on the multi-gang potentiometer. In doing so he locates the null points of other gangs by rotating the gear train for each tap location to be tested. The operator now reads the angle at which this null takes place, records this angle, and compares it with the tap location specifications. The operator now places the test console in the correct mode to measure total resistance and presses the test switch. If the resistance of the potentiometer does not conform to specification it will be rejected by a reject light.

The operator now locates a low electrical function angle and high electrical function angle of each gang by nulling at the end of the gang with the null detector by rotating the gear train to that point. This angle is now recorded and used for adjusting or trimming the potentiometer at high and low function angles. The gear train is set at these angles and an analog to digital encoder positions a relay operated voltage divider (ROVD) to the correct voltage ratio at that angle. The output of the ROVD and the wiper of the potentiometer are fed to the amplifier and null detector. The trim adjustments are made so that a null exists in the bridge circuit at the high and low electrical function angles. Once these adjustments are made the potentiometer may now be checked for linearity.

Once the potentiometer is set at a particular position, an analog to digital encoder is rotated in line with the path of the potentiometer under test. This analog to digital converter will indicate on the numeric indicator the particular value of angular position in a numeric decimal notation—324.32 degrees, 5.01 degrees, 180.00 degrees or whatever the particular value of angular rotation is at that point. Then, at the same time the analog to digital encoder also establishes the value of voltage ratio on the relay operated voltage divider that should be had at that particular rotation. In this way, there is in essence, a perfect electrical value for a particular mechanical value, and since the tolerance of the relay operative voltage divider is .001%, the operator is now able to verify potentiometers as good as .05%.

If there is a difference between the voltage ratio of the precision standard and the voltage ratio of the potentiometer under test, the error is then digitized to determine whether it is two bits below, three bits above, five bits below or however many bits of error the potentiometer is different from the voltage ratio standard.

The digitized error information is now set into the memory unit for that particular potentiometer cup and then the next point is tested to determine how far the potentiometer is in error from the correct voltage ratio. These digitized error bits are also set into the memory for the same potentiometer cup, and so by means of self-latching relays, the total amount of error at all the points tested on the particular potentiometer is stored. The slope ratio and tolerance of the particular potentiometer will determine the number of points to be tested.

But now the memory module has latched in the number of bits of error at all the points tested. Twenty-four bits are acceptable; twenty-five bits are unacceptable, whether the twenty-four bits are on the low side of the error curve or whether they are on the high side of the error curve. The only particular requirement is that twenty-four error bits for any one particular potentiometer is not exceeded. In this way the opeartor is able to verify an independent linear potentiometer, no matter what the slope of the particular function is. Similarly, a non-linear potentiometer is tested. Instead of having the voltage ratio established by the analog to digital encoder, decimal digital converter knobs are rotated to the particular value of voltage ratio which should be at the particular angular position shown on a numerical indicator.

In the original linearity and conformity test the potentiometer is verified against a known voltage ratio standard built into the tester. Tracking is verified by comparing the point to be tested on one potentiometer with the same point on the adjacent potentiometer. In this way the operator is able to confirm the tracking between adjacent cups on a multi-cup potentiometer. The precision potentiometer tester, also indicates the capability of the digital evaluation of an analog device testing a potentiometer at many points in order to verify its accuracy. The same techniques can be used in verifying transducers, whether pressure transducers, linear transducers, rotary transducers or velocity transducers using potentiometer take-offs. The same type of error detection and digitizing device can also be used in other applications.

In certain respects, the present invention may be viewed as comprising two groups of cooperating elements, on the one hand are a group of elements combined so as to supply varying ohmic values in accordance with a mathematical function, this group of elements includes the code holder adapted to move along a path past a reading station and holding one or more coded radices raised to one or more powers in combination with coefficients, said radix coefficient combination varying according to said predetermined mathematical function, e.g., according to the change in ohmic value of a rotating potentiometer; reading means at said reading station adapted to separately read the separate radix powers and coefficients as said code holder passes said station; switch means responsive to each of said reading means; and, a relay operated voltage divider including a center tap and paired resistors actuated by said switch means, each resistor of each of said pairs being of a ohmic value corresponding to a radix power or coefficient value, one of said resistors being switched into a resistor bank when its paired mate is shorted out of said bank, one of each of said pair being on each side of said center tap. The other group of elements comprise the null circuit which cooperates with the first group. This second group of elements includes a detector having input terminals to be joined to points which are supposed to be at null, said detector having a certain electrical value at null; a pair of trigger means actuated by said detector, one of said pair being actuated when said detector has a value above said electrical value, the other of said pair being actuated when said detector has a value below said electrical value; electrical units actuated by said trigger means, said units being provided in one direction by one of said trigger pair and in the other direction by the other of said trigger pair, furnishing to said detector the electrical value required to balance said detector and bring it back to null; a memory remembering the value of the electrical units fed to said detector and indicating means indicating when a predetermined number of said values have been exceeded.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A potentiometer tester comprising in combination; holding means for holding a potentiometer under test including leads for coupling to a direct current source; a code holder for holding a code of radix powers and coefficients;

moving means coupled to said holding means and said code holder for simultaneously turning said potentiometer along the wiper positions thereof and moving said code holder along a predetermined path of travel;

code reading means adjacent said code holder and having separate output signal producing means for each radix power and coefficient which can be read;

a relay having windings coupled to each of said separate output signal means and responsive thereto;

a relay operated voltage divider including input and output leads at the ends for correction to said source in a closed circuit, said relay operated voltage divider having a center tap and two sets of in series resistors on the one and the other side of said center tap adapted to be switched in or shorted out of a bank of resistors, there being one resistor in each set having an ohmic value corresponding to a radix power or coefficient of a code held by said code holder, each one of said relays having a pair of switches connected to energize resistors in each set having an ohmic value corresponding to the particular radix powers or coefficients read at said station, said switches switching in and shorting out resistors in each set having the same ohmic value, so that the total resistors in said bank between said input lead and center tap will correspond in ohmic value to said radix powers and coefficients at said station;

a servo null detector to which is fed the output of said center tap and said wiper, said detector having a null value when said outputs are equal;

polarity responsive output trigger means responsive to said detector and electromechanical means responsive to said triggers, one trigger causing said electromechanical means to move in one direction when said detector has a value below the null value, the other trigger causing said electromechanical means to move in the other direction when said detector circuit has a value above said null value;

stepped resistors connected in series in said detector circuit, so disposed that resistors are added to said detector circuit when said electromechanical means move in one direction whereas resistors are deducted from said detector circuit when said electromechanical means move in the other direction;

memory contacts corresponding to each of said stepped resistors and being engaged by said electromechanical means when a stepped resistor is added or deducted from said detector circuit, each memory contact being coupled with another memory contact which is separated therefrom by the amount of stepped resistors totalling the maximum predetermined permissible number of errors; memory means remembering and totalling the first engagement of either one of any of said coupled memory contacts; and signal means giving a signal when said total exceeds said predetermined permissible number.

2. A device as claimed in claim 1, said code holder including rotary means, said code being of the shaft position to digital readout type.

3. A device as claimed in claim 1, including a balancing trimmer variable resistor in a series with a first position on said potentiometer holder for coupling to one end of said tested potentiometer, whereby, when the total resistance of said bank on one side of said center tap is greater than the total resistance which the tested potentiometer should have, the tested potentiometer can nevertheless be tested.

4. A device as claimed in claim 1, said potentiometer holder including means for holding a plurality of cups of a tested potentiometer, said moving means simultaneously turning two cups, and output leads connectable to the wipers of said two cups so that the outputs from the two cup wipers can be fed to said null detector circuit to test the cups for tracking.

5. A device as claimed in claim 3, said potentiometer holder including a low angle trimmer variable resistor in series with a second position in said potentiometer holder for coupling to the low angle of the tested potentiometer, a low angle tap intermediate said potentiometer holder second position and said low angle trimmer variable resistor, a high angle trimmer variable resistor intermediate and in series with said potentiometer holder first position and said balancing trimmer variable resistor, and, a high angle tap, intermediate said first position and said high angle trimmer variable resistor so that by connecting asid low and high angle taps and the tested potentiometer, potentiometer wiper, across said null detector at the potentiometer low and high angles, the true low and high angles of the potentiometer can be ascertained and compensation provided therefor by said low and high angle variable resistors when testing said potentiometer.

6. A circuit as claimed in claim 1 said memory means including latch switches in series in a separate circuit, each latch switch being closed in response to engagement by either memory contact of one of said coupled memory contacts, the total number of latch switches corresponding to said predetermined permissible number of errors, said separate circuit being closed when all said latch switches are closed, said signal means being in said separate circuit in series with said latch switches and giving said signal when all said latch switches are closed.

References Cited in the file of this patent

UNITED STATES PATENTS

| | | |
|---|---|---|
| 2,715,208 | Hayes | Aug. 9, 1955 |
| 2,782,408 | Fisher et al. | Feb. 19, 1957 |
| 2,866,184 | Gray | Dec. 23, 1958 |
| 2,889,505 | Sigel | June 2, 1959 |
| 2,965,891 | Martin | Dec. 20, 1960 |

UNITED STATES PATENT OFFICE
CERTIFICATE OF CORRECTION

Patent No. 3,098,969                               July 23, 1963

Saul Liss et al.

It is hereby certified that error appears in the above numbered patent requiring correction and that the said Letters Patent should read as corrected below.

Column 13, line 50, for "correction" read -- connection --.

Signed and sealed this 11th day of February 1964.

(SEAL)
Attest:

ERNEST W. SWIDER
Attesting Officer

EDWIN L. REYNOLDS

Acting Commissioner of Patents